(12) United States Patent
Harris et al.

(10) Patent No.: US 10,367,177 B2
(45) Date of Patent: Jul. 30, 2019

(54) FLEXIBLE GREEN NONWOVEN BATTERY COVER AND METHOD OF CONSTRUCTION THEREOF (71) Applicant: FEDERAL-MOGUL POWERTRAIN, INC., Southfield, MI (US)

(72) Inventors: David Harris, Glenmoore, PA (US); Daniel A. Rowcotsky, Dresher, PA (US); John E. Burdy, Elverson, PA (US); Cassie M. Malloy, Blue Bell, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 349 days.

(21) Appl. No.: 15/096,426

(22) Filed: Apr. 12, 2016

(65) Prior Publication Data

US 2016/0226033 A1     Aug. 4, 2016

Related U.S. Application Data

(62) Division of application No. 13/592,150, filed on Aug. 22, 2012, now Pat. No. 9,334,591.

(Continued)

(51) Int. Cl.
*H01M 2/04*     (2006.01)
*H01M 2/10*     (2006.01)
(Continued)

(52) U.S. Cl.
CPC .......... *H01M 2/0482* (2013.01); *D04H 1/425* (2013.01); *D04H 1/4266* (2013.01);
(Continued)

(58) Field of Classification Search
CPC .... D04H 1/425; D04H 1/4266; D04H 1/4274; H01M 2220/20; H01M 2/043; H01M 2/0482; H01M 2/1094; Y10T 156/10
See application file for complete search history.

(56) References Cited

U.S. PATENT DOCUMENTS 7,744,143 B2 *  6/2010  Gladfelter ............. D21H 13/10
                                              156/62.2
2003/0049488 A1 *  3/2003  Yang ....................... B32B 5/26
                                              428/688

(Continued)

FOREIGN PATENT DOCUMENTS

EP       1164646 A      12/2001
JP       H0527959 U      4/1993

(Continued)

*Primary Examiner* — Sarah A. Slifka
*Assistant Examiner* — Lilia Nedialkova
(74) *Attorney, Agent, or Firm* — Robert L. Stearns; Dickinson Wright, PLLC (57) ABSTRACT

An insulative nonwoven battery cover and method of construction thereof is provided. The cover includes a plurality of nonwoven sections bonded together to form a desired structural configuration. The nonwoven sections are mats of heat-settable textile fibers and green materials including natural fibers, recycled materials and/or waste stream materials. The mats are formed having a bonded seam of the melted heat-settable textile fibers such that the cover is provided with a circumferentially continuous wall.

14 Claims, 5 Drawing Sheets

Related U.S. Application Data

(60) Provisional application No. 61/526,018, filed on Aug. 22, 2011.

(51) Int. Cl.
*D04H 1/4274* (2012.01)
*D04H 1/4266* (2012.01)
*D04H 1/425* (2012.01)

(52) U.S. Cl.
CPC .......... *D04H 1/4274* (2013.01); *H01M 2/043* (2013.01); *H01M 2/1094* (2013.01); *H01M 2220/20* (2013.01); *Y10T 156/10* (2015.01)

(56) References Cited

U.S. PATENT DOCUMENTS

2005/0202237 A1* 9/2005 Fryberger, Jr. ........... B32B 7/12
　　　　　　　　　　　　　　　　　　　　　　　428/354
2008/0211253 A1　9/2008 Gladfelter et al.
2009/0311456 A1* 12/2009 Harris ................... F16L 59/022
　　　　　　　　　　　　　　　　　　　　　　　428/36.1

FOREIGN PATENT DOCUMENTS

JP　　　2010086885 A　　4/2010
JP　　　20100531392 A　　9/2010

* cited by examiner

FLEXIBLE GREEN NONWOVEN BATTERY COVER AND METHOD OF CONSTRUCTION THEREOF

CROSS-REFERENCE TO RELATED APPLICATIONS

This U.S. divisional application claims the benefit of U.S. utility application Ser. No. 13/592,150, filed Aug. 22, 2012 which claims the benefit of U.S. Provisional Application Ser. No. 61/526,018, filed Aug. 22, 2011, which is incorporated herein by reference in its entirety.

BACKGROUND OF THE INVENTION

1. Technical Field

This invention relates generally to nonwoven battery covers, and more particularly to flexible insulative battery covers constructed at least partially from green material constituents.

2. Related Art

A thermal insulator is generally needed to insulate a battery, such as a vehicle battery, from thermal degradation. Rigid plastic covers are commonly used, however, they are relatively heavy and typically do not protect a battery against thermal conditions. Accordingly, rigid plastic covers generally do not provide the degree of insulation required to protect the battery against thermal degradation, thereby reducing the useful life of the battery. In addition, rigid plastic battery covers are inflexible, and thus, are generally bulky, cumbersome to ship and occupy valuable storage space, thereby increasing inventory cost.

In addition to rigid plastic covers, nonwoven mats are also used to cover batteries. However, although the current nonwoven covers are flexible and provided improved insulation over the rigid plastic covers, they are formed entirely from petroleum-based thermoplastics, thereby making them relatively costly to manufacture, and further, making them environmentally unfriendly after use.

SUMMARY OF THE INVENTION

According to one aspect of the invention, an insulative nonwoven battery cover is provided. The cover includes at least one nonwoven section formed to a desired structural configuration. The nonwoven section is provided as a mat of heat-settable textile fibers and green material including natural fibers, recycled materials and/or waste stream materials. The mat is formed having a bonded seam formed by melted regions of the heat-settable textile fibers such that the cover is provided with at least one circumferentially continuous nonwoven wall.

In accordance with another aspect of the invention, the heat-meltable fibers are provided from recycled material.

In accordance with another aspect of the invention, the at least one nonwoven wall has at least one hinge extending between opposite ends, with the at least one nonwoven wall having a first thickness and the at least one hinge having a second thickness that is less than the first thickness.

In accordance with another aspect of the invention, the at least one nonwoven wall includes a plurality of hinges.

In accordance with another aspect of the invention, the at least one nonwoven wall includes a pair of seams arranged diametrically opposite one another.

In accordance with another aspect of the invention, the at least one nonwoven wall includes a plurality of nonwoven walls arranged generally concentrically with one another.

In accordance with another aspect of the invention, each of the plurality of nonwoven walls is bonded to an adjacent one of the nonwoven walls.

In accordance with another aspect of the invention, the at least one nonwoven wall has a heat melted sealed end.

In accordance with another aspect of the invention, a method of constructing a flexible, insulative nonwoven battery cover is provided. The method includes providing green material and heat-meltable fibers. Then, forming at least one nonwoven mat having free edges from the natural fibers and the heat-meltable fibers. Then, bonding the free edges of the at least one nonwoven mat to one another along a seam to form at least one circumferentially continuous nonwoven wall.

In accordance with another aspect of the invention, the method includes providing the heat-meltable fibers from a recycled material.

In accordance with another aspect of the invention, the method further includes forming at least one hinge extending between opposite ends of the at least one nonwoven wall with the hinge having a reduced thickness from the nonwoven wall.

In accordance with another aspect of the invention, the method further includes forming a plurality of hinges in the at least one nonwoven wall.

In accordance with another aspect of the invention, the method further includes forming a pair seams in the at least one nonwoven wall.

In accordance with another aspect of the invention, the method further includes forming a plurality of the nonwoven walls and arranging the nonwoven walls generally concentrically with one another.

In accordance with another aspect of the invention, the method further includes bonding the plurality of nonwoven walls to one another.

In accordance with another aspect of the invention, the method further includes sealing at least one of the ends of the nonwoven walls by melting the end of the nonwoven walls.

In accordance with another aspect of the invention, the method further includes melting material of each of the adjacent ends of the nonwoven walls together.

In accordance with another aspect of the invention, the method further includes providing the green material from at least one of natural fibers, recycled materials, and waste stream materials.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
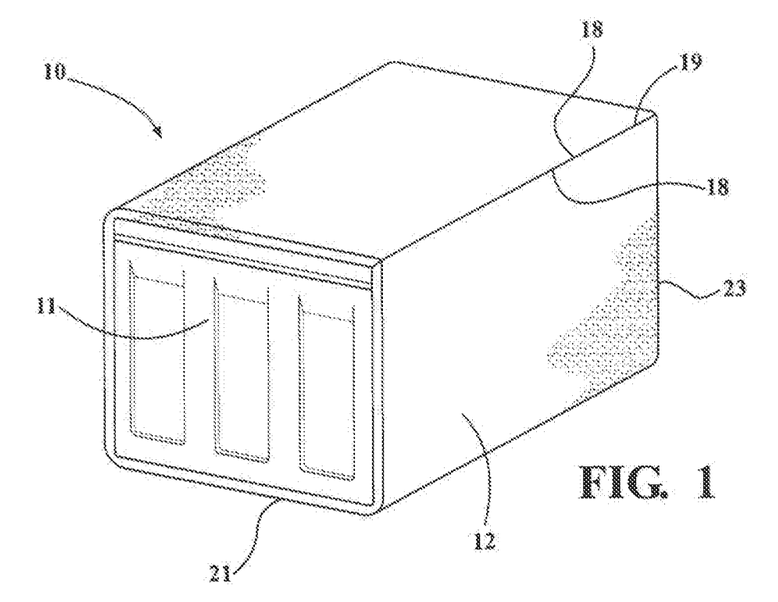
FIG. 1 is a schematic perspective view of a flexible, at least partially green nonwoven battery cover constructed in accordance with one aspect of the invention.
Figure 2:
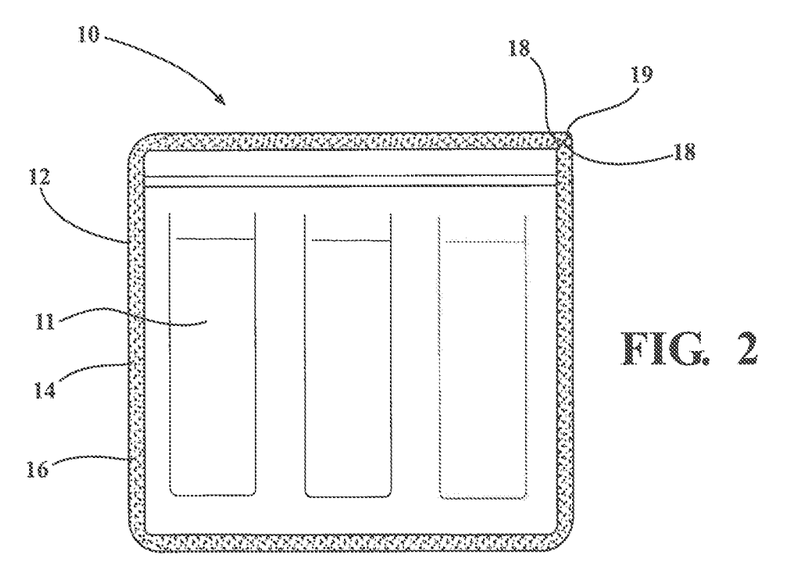
FIG. 2 is cross-sectional view of the battery cover of FIG. 1.

Referring in more detail to the drawings, FIG. 1 illustrates a flexible, green, or at least partially green nonwoven battery cover, referred to hereafter as cover 10, constructed in accordance with one aspect of the invention shown disposed about a battery 11 to provide thermal protection to the battery 11. The cover 10 has a nonwoven wall 12 constructed from green materials, represented generally at 14, such as a blend of natural fibers, recycled materials and/or waste stream materials, and heat-settable fibers, also referred to as heat-meltable textile fibers, represented generally at 16. The nonwoven wall 12 provides the cover 10 with the needed thermal protection to the battery 11, while at the same time being flexible and lightweight. As such, the cover 10 is able to be readily compacted or generally flattened for shipping and storage purposes, while being lightweight in use, thereby minimizing the added weight to the vehicle. In addition, the cover 10 is readily renewable, reduces the impact on landfills and is economical in manufacture.

The green materials 14 can be provided from any suitable natural fibers, such as jute, kenaf, hemp and the like, and also from any suitable recycled materials and/or waste stream materials. The green materials 14 can also be provided as any mixture of Asian (an inferior grade of cardboard commonly produced in Asian countries, e.g. China and Korea and shipped into the U.S., which is typically considered non-recyclable by various state environment agencies heretofore, such as in Connecticut, New Hampshire and Massachusetts) and standard cardboard material (that made from wood, such as pine, which is typical in the U.S). Because recyclers typically allow only 5% Asian cardboard mixed with the "Standard Cardboard", the focus of this patent is on recycled cardboard with between 5% and 100% Asian cardboard. This "Standard" and "Asian" mixture will hereafter be referred to as "mixed Asian cardboard". As such, a method of recycling cardboard materials for use in manufacturing vehicle components, in accordance with one aspect of the invention, negates the need to separate inferior, low-grade cardboard materials, including Asian cardboard, from higher grade cardboard, such as that manufactured in the U.S. Accordingly, piles, bundles, or mixtures of standard high grade cardboard material from cardboard containers can be readily recycled in combination with the Asian cardboard without concern of separating the two types of cardboard materials from one another. The content of the cardboard, whether mixed or 100% Asian, is preferably between about 25-99 weight percent of the total web weight, depending on the desired characteristics of the cover 10, as desired. Generally, about 25% recycled material in a new product is needed in order to be considered a "Recycled" product.

The Asian cardboard is considered to be a low grade, non-recycleable cardboard due to its being constructed from inferior constituent ingredients, such as low quality recycled fibers, bamboo fibers, jute, rice fibers, and/or other scrap/waste materials. As such, Asian cardboard is typically considered to be a serious non-recycleable contaminant, whether on its own or if bailed or otherwise included in reclaimed post consumer cardboard loads. Accordingly, if Asian cardboard is bailed with standard U.S. cardboard, then the entire bail or load is typically considered to be non-recycleable waste (again, typically including a content of Asian cardboard above 5%). Asian cardboard can be distinguished from higher quality U.S. cardboard by its flimsiness and characteristic pale brown, yellow or greenish color. Accordingly, Asian cardboard is typically separated from higher U.S. quality cardboard, and sent to landfills, burned, or otherwise disposed.

The inability of Asian cardboard to be recycled stems from the constituent ingredients of the inferior fibers used in the construction of the Asian cardboard, which are generally very short and thus very weak. Given the relatively fine size of the fibers and other powdery ingredients in Asian cardboard, if the Asian cardboard is processed in known wet recycling processes along with standard cardboard having fibers of an increased length, the ingredients of the Asian cardboard get flushed through the screens and carried into the waste stream and/or plug and otherwise damage the recycling equipment. Accordingly, in accordance with the invention, the construction of the cover 10 is performed in a dry process, thereby allowing the utilization of the inferior Asian cardboard along with the fibers having a length less than 0.2 mm (referred to as "fines") in it's manufacture.

The heat-meltable material 16 can be provided, for example, as a low temperature melt polymeric material, such as fibers of polyethylene, PET or Nylon. It should be recognized that other low melt polymeric materials could be used, such as thermoplastic bi-component fibers whose outer sheath, such as polypropylene, for example, melts when heated above its melting point. This melted resin then fuses with the mixture of any textile natural fibers present and the cardboard fibers and with remaining binders from the recycled cardboard materials. As an example, the melting point of the outer portion of a PET low melt fiber may be approximately 110° C.-180° C. as compared to the core melting at 250° C. Persons skilled in the art will recognize that other coatings or fillers and filler fibers may be used in place of low melt fibers to achieve the desired result.

The heat-meltable material 16 is provided having a suitable wt % content of the wall 12, such as about 10 wt % or more, by way of example and without limitation, to allow free edges 18 of the wall 12 to be bonded to one another to form the wall having a welded seam 19 and the desired configuration, shown here, by way of example and without limitation, as being rectangular. It should be recognized that the wt % of heat-meltable material could be less than 10%, depending on the materials and bonding process used. The heat-meltable fibers 16 are preferably provided from recycled plastic materials, such as recycled carpet or shredded PET rags, for example. Accordingly, the use of these recycled materials reduces the amount of materials being sent to landfills.

Figure 7:
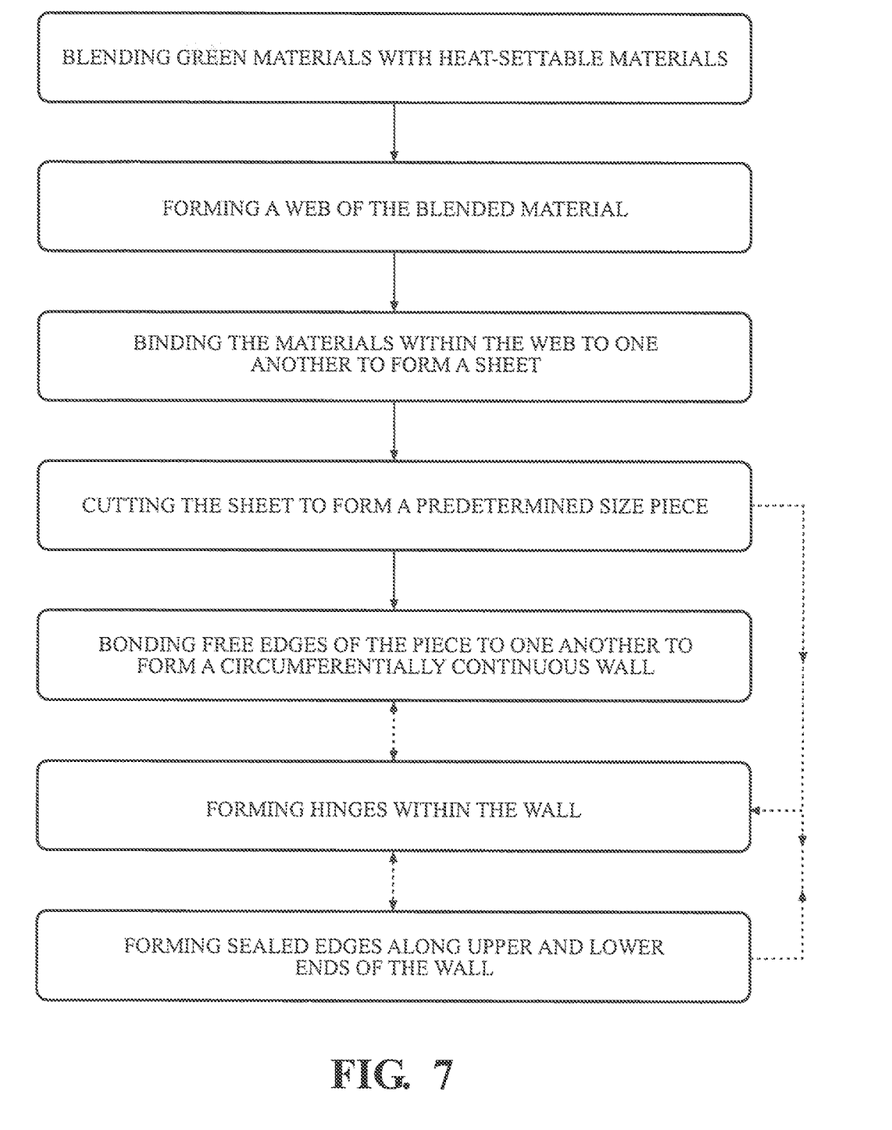
FIG. 7 is a process flow diagram illustrating a method of constructing the flexible, at least partially green nonwoven battery cover in accordance with another aspect of the invention.

As illustrated in a flow chart in FIG. 7, the process for constructing the wall 12 includes mixing or blending the green materials 14, e.g. natural fibers, with the heat-meltable fibers 16 and forming a web of the blended materials. The webbing process, which may be performed in an airlay process, for example, on a Rando machine, or in a carding process, forms a homogenously mixed natural fiber/meltable fiber mat or web, with the green material 14 and fibers 16 being randomly oriented.

Then, upon forming the web, the web is consolidated to bind the green and fibrous materials to one another, such as via a mechanical, chemical and/or thermal process. For example, the web can be heated, such as in an oven, to a temperature suitable to at least partially melt the heat-meltable fibers 16, thereby thermally bonding the blend of green materials 14 with the heat-meltable fibers 16. Otherwise, or in addition, the web can be subjected to a needling process to entwine the green materials 14 and fibers 16 with one another and/or to a chemical process wherein a chemical binder is utilized to bond the green materials 14 and fibers 16 together. Regardless of the consolidating process selected, the web is formed into a sheet, wherein the sheet attains a desired thickness t.

Then, upon forming and cooling the sheet, the sheet is cut to form the desired size piece and general configuration of the wall 12. Then, the desired free edges 18 are brought into abutting relation with one another, whereupon the free edges 18 are bonded to one another under the application of suitable heat, e.g. welded, such as in an ultrasonic welding process, for example. As such, the wall 12 is configured having a circumferentially continuous outer surface extending between opposite ends 21, 23.

Figure 3:
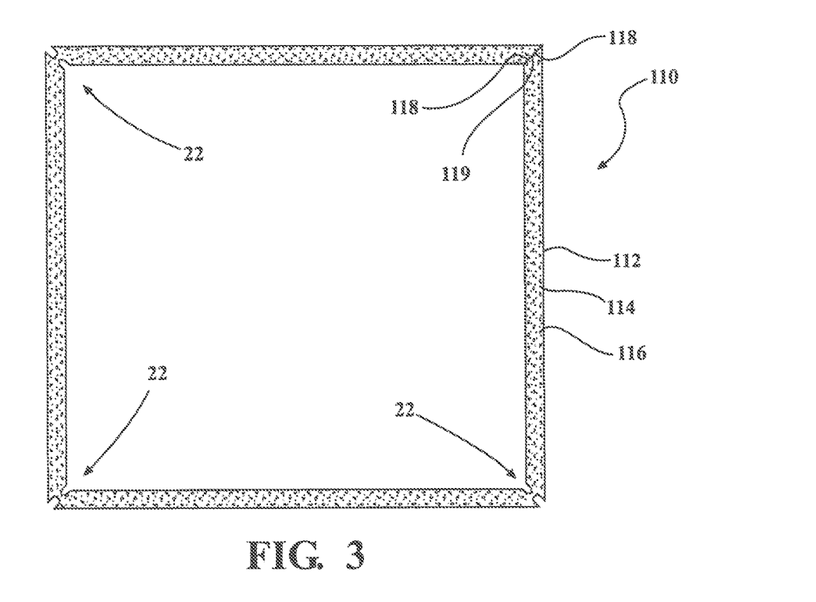
FIG. 3 is cross-sectional view of a flexible, at least partially green battery nonwoven cover constructed in accordance with another aspect of the invention.

In addition to those aspects described above, further aspects of the invention are contemplated herein. For example, as shown in FIG. 3, a cover 110 is shown constructed in accordance with another aspect of the invention, wherein the same reference numerals as used above, offset by a factor of 100, are used to identify like features described above.

Figure 3A:
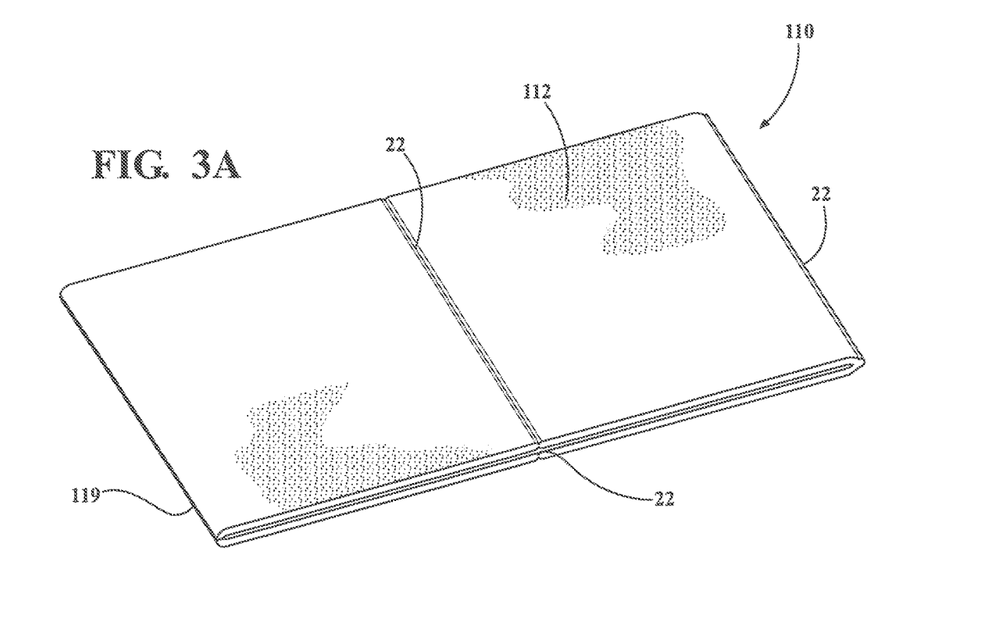
FIG. 3A is a view of the battery cover of FIG. 3 shown in a flattened, shipping configuration.

The cover 110 has a circumferentially continuous rectilinear wall 112 formed of the same green materials 114 and heat-meltable fibers 116 described above. The wall 112 includes at least one weld seam 119 bonding opposite edges 118 of the wall to one another. In addition, to facilitate folding and unfolding of the wall 112 between the flattened shipping configuration and the unfolded use configuration, the wall 112 includes a plurality of hinges 22 formed within the material of the wall 112. The hinges 22 extend between opposite ends 121, 123 of the wall 112 and are formed in a melting process, preferably before bonding the free edges 118 to one another, as detailed in the process flow of FIG. 7, wherein heat and pressure are applied in combination with one another via a heated compressing fixture to allow the inner and/or outer surfaces of the wall 112 to be compressed to formed the desired reduced thickness compressed configuration of the hinge 22. Accordingly, with the hinges 22 being formed under heat and compression, they have a reduced thickness and increased density relative to the wall 112 which provides the hinges 22 with their enhanced flexibility. Accordingly, the wall 112 has a first thickness and the hinges 22 have a second thickness, wherein the second thickness is less than the first thickness. One of the hinges 22 is shown being diametrically opposite the weld seam 119 while the other hinges 22 are shown being diametrically opposite one another. Accordingly, the wall 112 is well suited to be flattened either across the pair of diametrically opposite hinges 22 or across the diametrically opposite weld seam 119 and hinge 22.

Figure 4:
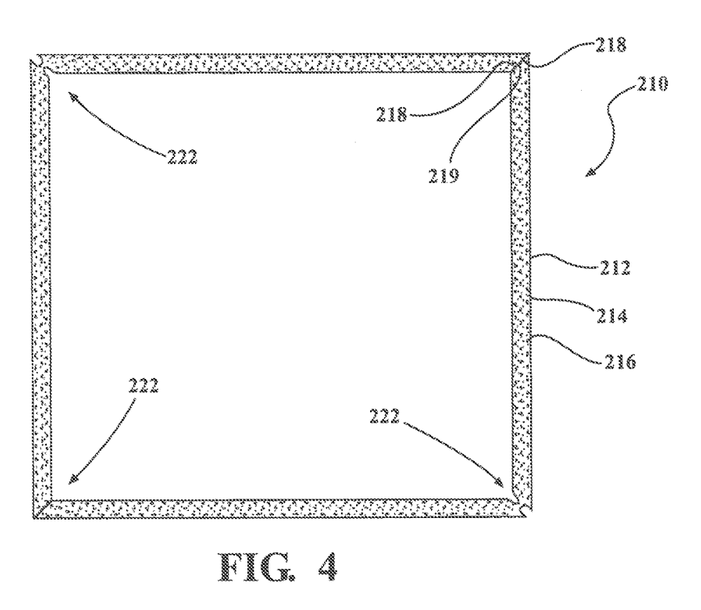
FIG. 4 is cross-sectional view of a flexible, at least partially green nonwoven battery cover constructed in accordance with yet another aspect of the invention.
Figure 4A:
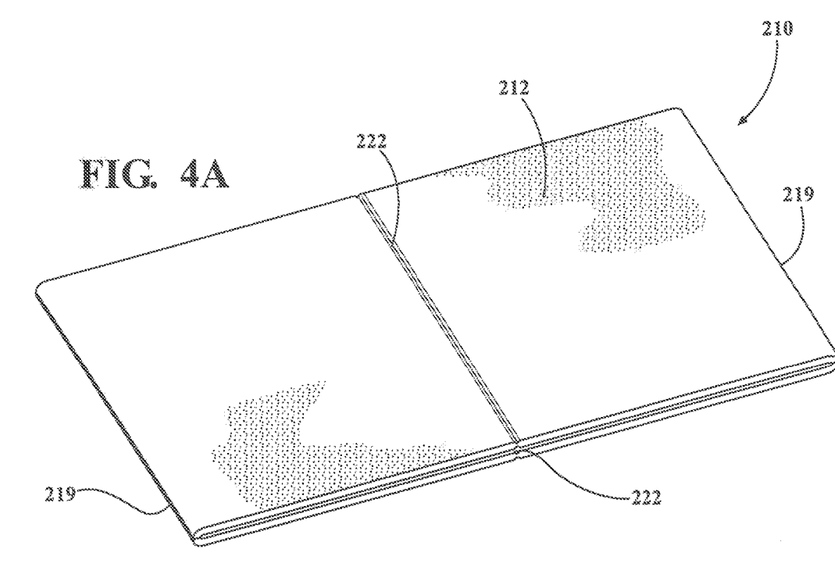
FIG. 4A is a view of the battery cover of FIG. 4 shown in a flattened, shipping configuration.

In FIG. 4, a cover 210 is shown constructed in accordance with another aspect of the invention, wherein the same reference numerals as used above, offset by a factor of 200, are used to identify like features described above, The cover 210 has a circumferentially continuous wall 212 formed of the same green materials 214 and heat-meltable fibers 216 described above. The wall 212 includes a pair of weld seams 219 bonding opposite edges 218 of the wall to one another, wherein the weld seams 219 are shown as being diametrically opposite one another. In addition, to facilitate folding and unfolding of the wall 212 between the flattened shipping configuration and the unfolded use position, the wall includes a pair of hinges 222 formed as described above, wherein the hinges 222 are shown being diametrically opposite one another. Accordingly, the wall 212 is well suited to be flattened for shipping and/or storage either across the pair of the diametrically opposite hinges 222 or across the diametrically opposite weld seams 219.

Figure 5:
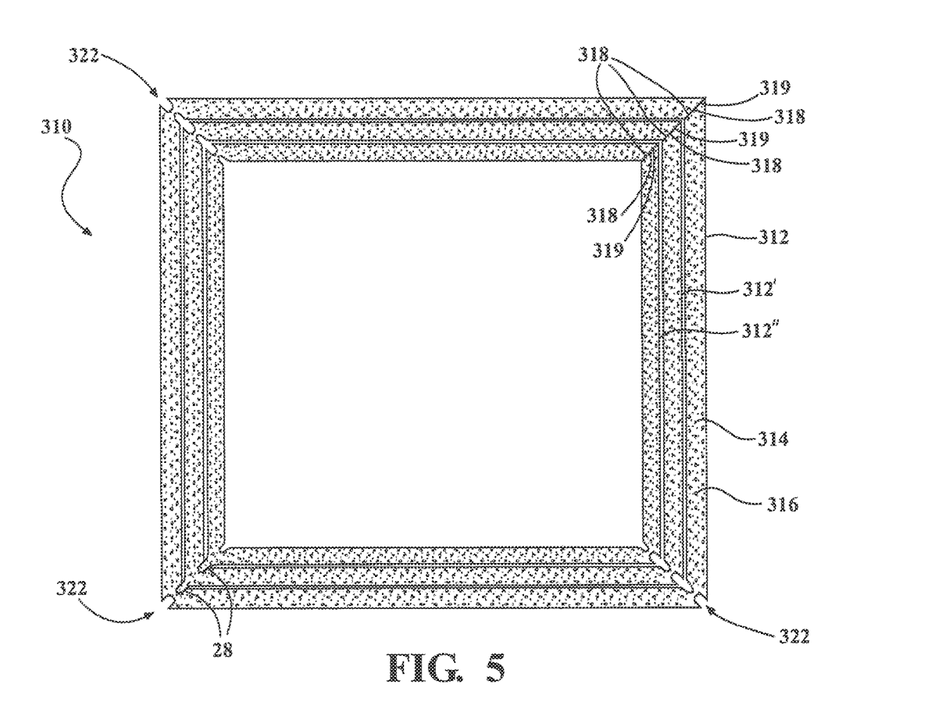
FIG. 5 is cross-sectional view of a flexible, at least partially green nonwoven battery cover constructed in accordance with yet another aspect of the invention.

In FIG. 5, a cover 310 is shown constructed in accordance with another aspect of the invention, wherein the same reference numerals as used above, offset by a factor of 300, are used to identify like features described above.

The cover 310 is constructed having a plurality of circumferentially continuous walls, shown here, by way of example and without limitation, as having three walls 312, 312', 312" arranged generally concentrically with one another. Each of the walls 312, 312', 312" can be formed of the same green materials 314 and heat-meltable fibers 316 described above, wherein the individual walls can be constructed of different green material 314 and different fibers 316 from one another, or further, the individual walls can be constructed of the same green material 314 and same fibers 316 as one another, and further yet, they can be constructed having the same or similar configuration as described for the walls 12, 112, 212, shown here as being generally the same as described for the wall 112, though each wall could have a different or slightly different configuration, if desired. Accordingly, each wall 312, 312', 312" has a single weld seam 319 bonding opposite edges 318 to one another. In addition, to facilitate folding and unfolding of the walls 312, 312', 312" between the flattened shipping configuration and the unfolded use position, the walls include a plurality of hinges 322 formed as described above, wherein a pair of the hinges 322 are shown being diametrically opposite one another, while another of then hinges 322 is shown being diametrically opposite the weld seam 319. To provide the cover 310 as a single piece assembly, the nonwoven walls 312, 312', 312" are attached to one another, with adjacent nonwoven walls 312, 312', 312" being bonded to one another and are shown here as being bonded to one another at a bond joint 28 across at least one set of the hinges 322, such as being welded together under heat and pressure. In addition, the walls 312, 312', 312" can be constructed having at least one wall of a different nonwoven composition, for example, the outer and inner walls 312, 312" can be formed of a nonwoven polypropylene material without including green materials, while the middle layer 312' can be constructed as detailed above for wall 12.

Figure 6:
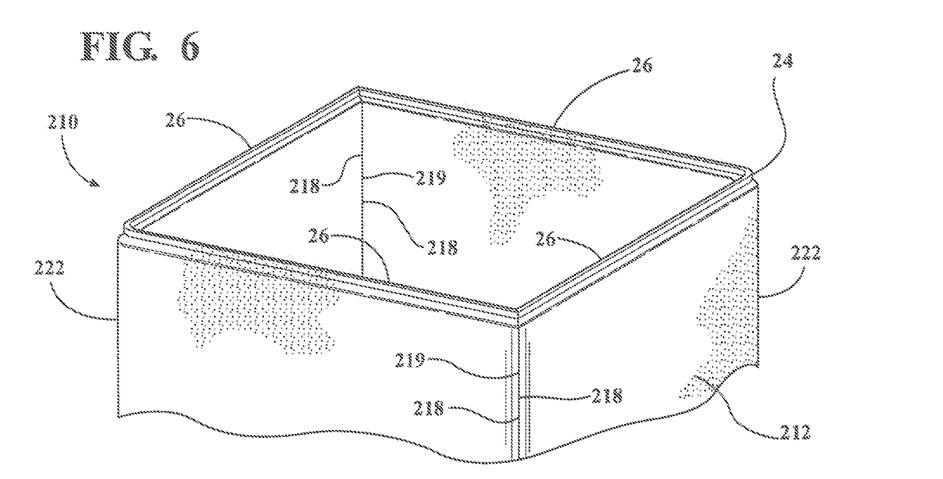
FIG. 6 is a partial, end perspective view of a flexible, at least partially green nonwoven battery cover constructed in accordance with yet another aspect of the invention.

In FIG. 6, a further aspect of the invention is shown, wherein at least one of the ends of the sleeve 10, 110, 210, 310, shown here, by way of example and without limitation, as an end 24 of the sleeve 210, has a seal 26 to prevent end fray of the wall 212 as well as to prevent any fluid/moisture absorption into the wall 212 through the ends 24. The seal 26 can be provided in any suitable heat-melting/pressure applying process, such as a welding process, e.g. ultrasonic welding process, for example. The seals 26 at the ends 24 are preferably formed before bonding the free edges 218 to one another, as shown in FIG. 7. If incorporated in the cover 310, the cover 310 can further benefit from formation of seals along the upper and lower ends of the individual walls 312, 312', 312" by facilitating attaching the walls to one another via the sealed ends. Accordingly, a single seal at each end would bond each of the walls 312, 312', 312" to one another.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A method of constructing a battery cover, comprising:
providing green material;
providing heat-meltable fibers;
forming a plurality of separate nonwoven mats each having free edges from the green material and the heat-meltable fibers;
bonding the free edges of each of the separate nonwoven mats to one another along at least one seam to form a plurality of separate circumferentially continuous nonwoven walls;
arranging the plurality of separate nonwoven walls in generally concentric relation with one another;
forming at least one hinge spaced from said at least one seam in each of the plurality of nonwoven walls, the at least one hinge extending between opposite ends of each nonwoven wall with the at least one hinge having a reduced thickness from the nonwoven wall; and
bonding the plurality of nonwoven walls to one another across at least one of said at least one hinge in spaced relation from said at least one seam.

2. The method of claim 1 further including providing the heat-meltable fibers from a recycled material.

3. The method of claim 1 further including forming a plurality of the at least one hinge in each of the nonwoven walls.

4. The method of claim 3 further including forming a pair of the at least one seam in each of the nonwoven walls.

5. The method of claim 4 further including arranging the pair of seams diametrically opposite one another.

6. The method of claim 1 further including performing the bonding by melting material of adjacent nonwoven walls together under pressure.

7. The method of claim 6 further including sealing at least one of the ends of the nonwoven walls by melting the end of the nonwoven walls.

8. The method of claim 7 further including melting material of each of the ends of the nonwoven walls together.

9. The method of claim 1 further including sealing at least one end of at least one of the plurality of nonwoven walls by melting the end of the at least one nonwoven wall.

10. The method of claim 1 further including providing the green material including natural fibers.

11. The method of claim 1 further including providing the green material including recycled materials.

12. The method of claim 1 further including providing the green material including waste stream materials.

13. The method of claim 1 further including forming at least one of the plurality of said nonwoven walls having a different material content than another of the plurality of nonwoven walls.

14. The method of claim 13 further including forming at least one of the nonwoven walls from polypropylene without green materials.

* * * * *